March 2, 1965   G. CONSTANTINE, JR   3,172,083
ELECTROLYTIC MEMORY
Filed Jan. 12, 1962
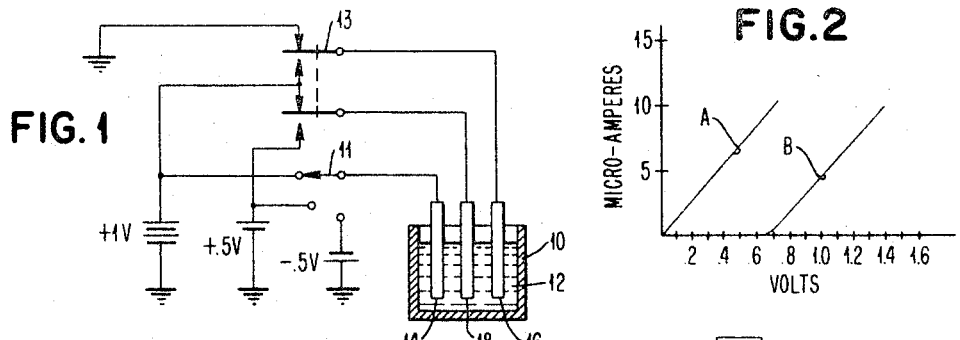
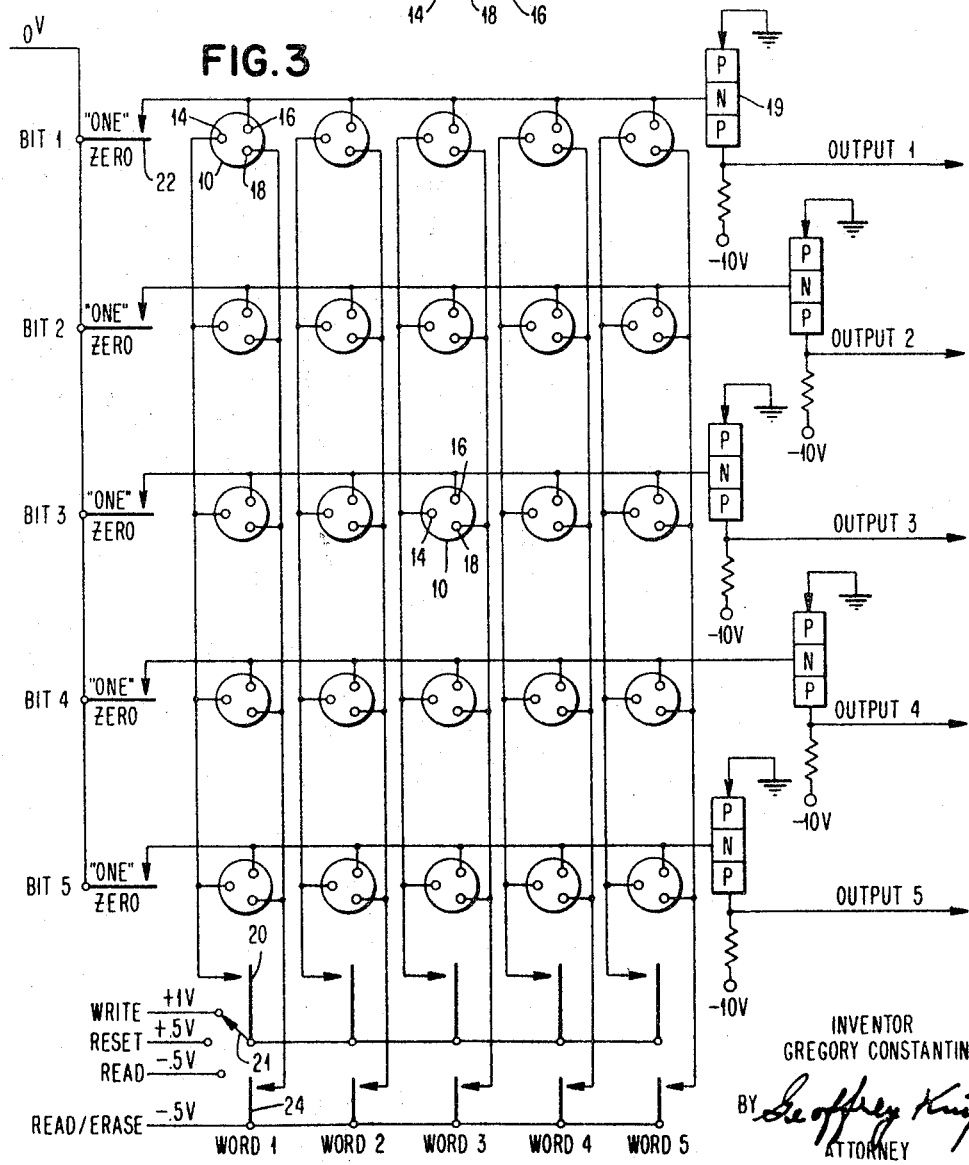
INVENTOR
GREGORY CONSTANTINE JR
BY Geoffrey Knight
ATTORNEY

United States Patent Office 3,172,083
Patented Mar. 2, 1965

3,172,083
ELECTROLYTIC MEMORY
Gregory Constantine, Jr., Arlington, Mass., assignor to International Business Machines Corporation, New York, N.Y., a corporation of New York
Filed Jan. 12, 1962, Ser. No. 165,762
9 Claims. (Cl. 340—173)

This invention relates to electrolytic storage elements and to a memory matrix comprising such storage elements.

Existing devices for the storage of information in computers involve the use of magnetic drums, magnetic tapes, electrostatic storage tubes, magnetic cores and the like. These devices either have the disadvantage of slow access time, as in tapes and drums; require expensive powering circuits, as in magnetic cores; or require the maintenance of an exciting voltage, as in electrostatic storage devices.

It is an object of this invention to provide an inexpensive storage element which may store either analog or digital information.

It is another object of this invention to implement a memory matrix utilizing such storage elements.

Briefly, the invention is concerned with an electrolytic storage element having at least two electrodes inert with respect to an electrolyte which contains the salt of a metal therein.

If a small positive voltage is applied to the first electrode and a negative voltage applied to the second electrode there will be no activity in the cell if the voltage difference between the electrodes is below a certain threshold voltage. However, if this voltage difference is increased beyond the threshold, metal will be plated out of the electrolytic solution onto the more negative second electrode. When the voltage is removed or decreased below threshold, plating will cease.

Now if a positive voltage is applied to the second electrode and a negative voltage is applied to the first electrode, plating will occur on the first electrode, even though the threshold voltage is not exceeded. In other words, if the positive electrode is plated with metal so that it is active with respect to the electrolytic solution, the threshold voltage need not be exceeded to cause plating on the more negative electrode. However, plating will occur at this lower-than-threshold voltage only for so long as there is metal on the positive electrode. As soon as all the metal plated on the positive electrode has transferred to the negative electrode the plating action will cease. An equivalent amount of metal, of course, is plated on the more negative electrode. If the voltage difference had been above the threshold, or is increased to above threshold, plating will continue on the more negative electrode as previously described.

The invention takes advantage of the conditions described by using the fact that an electrode has been plated to indicate that information has been stored. Suppose, for example, the cell is to be used to store digital information. A positive voltage is applied to the first electrode and a negative voltage is applied to the second electrode. Plating occurs on the second electrode if the voltage difference between the electrodes is greater than the threshold voltage. The cell is read or sampled by applying a positive voltage to the second electrode and a negative voltage to the first electrode, the voltage difference between electrodes being less than the threshold voltage. A current will flow if the second electrode has plating on it, and the presence of this current flow indicates that a binary one had been stored.

Subsequent reading or sampling of the cell may be accomplished by first transferring the plating back to the second electrode. This is done by applying a positive voltage to the first electrode and a negative voltage to the second electrode, the voltage difference being less than the threshold voltage. The cell may then be read again as previously described.

Provision can also be made to erase the information stored in the cell. This would be necessary if it were desired to write a zero into a cell in which a one bit had previously been stored. In order to accomplish erasing, a third electrode is added to the electrolyte. Now by applying a negative voltage to the third electrode and a positive voltage to each of the first two aforementioned electrodes, plating on either of the first two electrodes will be transferred to the third electrode.

Since the amount of plating on an electrode depends on the length of time the plating voltage is applied, storage of quantitative values is possible. Reading of quantitative values is also possible because when a voltage of a magnitude less than the threshold voltage is applied between the electrodes, deplating of the positive electrode onto the negative electrode will occur for a length of time proportional to the amount of plating on the positive electrode.

As will be shown hereinafter, the storage device has the advantage of being able to store information for a period of time. It has the further advantage that it is not necessary to supply power to the storage element continuously in order to retain the information stored therein.

When used in a memory matrix, information stored therein can be located with a comparatively fast access time. Also, as will be shown, the data stored may be read out without destroying the information stored.

The foregoing and other objects, features and advantages of the invention will be apparent from the following more particular description of the preferred embodiment of the invention, as illustrated in the accompanying drawings.

In the drawings:

FIG. 1 is a sectional view of the electrolytic storage element;

FIG. 2 is a voltage-current characteristic curve for voltages applied between pairs of electrodes; and, FIG. 3 is a storage matrix utilizing the storage element of FIG. 1.

The storage element of FIG. 1 comprises a container 10 of a copper sulphate electrolyte 12, consisting of one-half of the concentration of $CuSO_4$ in $H_2O$ corresponding to saturation at room temperature buffered to a pH of about 1, with $H_2SO_4$. Three independent electrodes 14, 16 and 18 are submerged in the electrolytic solution 12. The electrodes 14 and 16 must be inert with respect to the copper sulphate electrolyte, the electrode 18 need not be inert. It has been found that platinum is a good material for electrodes 14 and 16 and copper is a good material for electrode 18; however, it is contemplated that this invention may be practiced by using other materials within the knowledge of those skilled in the art.

The storage element has a response characteristic similar to that shown in FIG. 2. The response curve B exists when a voltage is applied between two electrodes the more positive of which is inert (anode). A voltage of approximately .7 volt may be applied without any activity in the cell. However, when voltages in excess of this threshold value are applied, a plating action commences and copper is plated out of the electrolyte onto the more negative electrode (cathode).

The curve A of FIG. 2 shows the response when a voltage is applied between two electrodes, the anode of which is not inert. This response characteristic has no threshold and will be obtained when voltage is applied between an active (copper plated) anode and any other electrode.

In order to store information in the cell, a plus 1 volt potential is applied to electrode 14 by switch 11 and ground potential is applied to electrode 16 by switch 13. Since this voltage is above the threshold of .7 volt, as shown in FIG. 2, curve B, plating will occur at the electrode 16 due to electrolytic action. Plating will continue until the voltage is removed. The presence of plating on electrode 16 in digital terms could represent storage of a ONE bit; or, in analog terms, the length of time plating was continued would represent an analog value.

It is necessary to be able to read the information stored in the cell without necessarily destroying the information. This is accomplished by applying a negative .5 volt potential to electrode 14 and ground potential to electrode 16. This potential, according to FIG. 2, is sufficient to cause the metal plated on electrode 16 to be transferred to electrode 14, as shown in curve A, but this potential is less than the threshold value of .7 volt so that no further metal is plated during the reading operation after electrode 16 has been deplated. A current will flow between electrodes 14 and 16 for the period of time metal is transferred. By measuring the length of time this current flows, the analog value stored can be determined. The mere presence of a current will be indicative of a binary ONE digit stored.

In order to subsequently read out the same information, it is necessary to reset the stored information by transferring the plated metal from electrode 14 back to electrode 16. This is done by applying a plus .5 volt potential to electrode 14 and ground potential to electrode 16. The metal on electrode 14 would then transfer to electrode 16 but no more metal would be plated onto electrode 16 after electrode 14 has been deplated because the voltage potential is below the threshold voltage.

If it is desired to erase the information stored or to write a ZERO in a cell in which a ONE bit had previously been stored, it is necessary to add a third electrode 18 to the cell. A plus .5 volt potential difference applied between electrode 16 and electrode 18 causes a transfer of metal from electrode 16 to electrode 18, thus erasing the information stored.

FIG. 3 shows a plurality of storage elements of the type shown in FIG. 1 utilized in a memory matrix. In the matrix, the storage elements 10 are arranged in columns and rows. All of the electrodes 14 in a column are wired in parallel to a word selection switch 20. All of the electrodes 16 in a row are wired in parallel and each row is connected to the base of a transistor 19. All of the electrodes 18 in a column are also wired in parallel and are connected to a switch 24.

Closing any one or more of the switches 20 will connect any one or more of the columns of elements 14 to the common terminal of a selector switch 21. The common terminal of selector switch 21 may be switched to either minus .5, plus .5, or plus 1 volt, as shown.

At the start of the write operations, selector switch 21 is set to 1 volt potential. To write information into the matrix, one of the word selection switches 20, controlling a column of electrodes 14, is closed to apply a plus 1 voltage potential to each electrode in that column. Information bits are entered into the memory by selecting the ZERO (lower) or ONE (upper) position of the bit selection switch 22 in each row.

If a ONE is selected in a particular row, 0 volt will be applied to all electrodes 16 in that row. Since one of the word selection switches 20 is closed, placing a plus 1 volt potential on all electrodes 14 in a column, the memory cell at the intersection of the column and row selected will have a 1 volt potential on electrode 14 and a 0 volt potential on electrode 16. Plating will, therefore, occur on electrodes 16 according to the curve B of FIG. 2 because the voltage so supplied is greater than the threshold value necessary to plate metal out of the electrolytic bath.

If a ZERO information bit is selected in a row by switch 22, no potential will be placed on electrode 16 and no action will occur in the cell in that row.

In order to read the information out of any column, the selector switch 21 is switched to minus .5 volt and switches 22 are left opened. Electrodes 16 in each row are now connected only to the bases of transistors 19. Now if the switch 20 of the desired column is closed, electrodes 14 of each cell in that column will be .5 volt more negative than the electrodes 16 in that column. Therefore, in each cell in which a ONE was stored (i.e. in which plating exists on the cell's electrode 16), a current will flow. The transistors 19 are normally cut-off; that is not conducting. This current causes the base of transistor 19 to become negative with respect to its emitter which is at ground, thus switching the transistor "on" causing an output pulse. This pulse will remain as long as current flows, which, of course, depends upon the amount of plating on the electrode 16. An output pulse will occur for each bit position in which a ONE has previously been stored in the particular column selected.

At the end of the reading operations, the metal plated on 16 will now be plated on 14. No plating out of the electrolyte will occur because the voltage applied to the electrodes is less than the threshold value necessary for plating out of the electrolyte. It is necessary to "reset" the cell if it is desired to read the information again at a later time. Resetting is accomplished by transferring the metal plated on electrodes 14 during the read operation back to the electrodes 16. Selector switch 21 is switched to plus .5 volt. All switches 22 are switched to the ONE position. This places 0 volt on the electrodes 16. Now, by closing all switches 20, plus .5 volt will be applied to all electrodes 14, causing metal to be plated on the more negative electrodes 16, in all positions in which ONES had been stored, that is in which plating exists on electrodes 14. The information may now be read out again, as previously described.

It is also desirable to be able to destroy or "erase" information stored, or to read the information destructively. This is accomplished by transferring metal from electrodes 14 to electrode 18. Erasing is accomplished by closing switches 24 and switching switches 22 to the ONE position, thus placing a 0 volt potential on electrodes 16 and a minus .5 volt potential on electrode 18. Since electrode 18 is .5 volt more negative than 16, plating will occur from 16 to 18, thus erasing any plating which may have been plated on electrode 16.

In summary, the following operations can be performed. Quantitative values can be written into the cell by applying a voltage which is greater than the threshold voltage for a period of time which is proportional to the quantitative value. This causes plating on the negative electrode.

Reading of quantitative values is accomplished by applying a voltage of reversed polarity from the writing voltage and of a magnitude less than the threshold voltage. A current will flow for a period of time proportional to the quantitative value stored.

Resetting of the memory cell is accomplished by applying a voltage of the same polarity as the write voltage—but less than the threshold voltage—for effectively transferring the plating back to the originally plated electrode. The cell can now be read again.

Erasing of the information stored may be accomplished by applying a voltage to a third electrode which is negative with respect to the first two mentioned electrodes. This causes deplating of either or both of the first two mentioned electrodes. The cell is now in a condition for rewriting of quantitative information.

As can be seen from the foregoing description, the memory device described has the advantage that when the information is read it may not be completely destroyed but kept stored in the cell with the cell in a condition to be reset to its original condition so that the information may be again read out.

While the invention has been particularly shown and described with reference to a preferred embodiment thereof, it will be understood by those skilled in the art that various changes in form and detail may be made therein without departing from the spirit and scope of the invention.

I claim:
1. An electrochemical storage element comprising:
   an electrolytic solution containing therein at least the salt of a metal;
   first and second inert electrodes submerged in said solution;
   a first voltage source connected to said second electrode for applying to said second electrode a voltage which is negative with respect to said first electrode and of sufficient magnitude to cause plating of the metal out of the electrolytic solution onto said second electrode by electrolysis;
   and a second voltage source connected to said first electrode for applying to said first electrode a voltage which is negative with respect to said second electrode, and which is of sufficient magnitude to cause plating on said first electrode if said second electrode has metal plated on it but which is of insufficient magnitude to cause plating on said first electrode if said second electrode does not have metal plated on it.
2. Claim 1 wherein said electrolyte consists of:
   one half of the concentration of $CuSO_4$ in $H_2O$ corresponding to saturation at room temperature buffered to a pH of about 1 with $H_2SO_4$.
3. An electrochemical storage element comprising:
   an electrolytic solution containing therein at least the salt of a metal;
   first and second inert electrodes submerged in said solution;
   writing means for applying a voltage to said second electrode which is negative with respect to said first electrode and of sufficient magnitude to cause plating of the metal out of the electrolytic solution onto said second electrode by electrolysis;
   reading means for applying a voltage to said first electrode which is negative with respect to said second electrode and of insufficient magnitude to cause plating of said metal out of the electrolytic solution, for allowing current flow between said first and said second electrodes when said second electrode has metal plated on it;
   a third electrode submerged in said solution; and
   erasing means for applying a voltage to said third electrode which is negative with respect to said first and second electrodes and of insufficient magnitude to cause plating of said metal out of the electrolytic solution, for removal of any plating on either of said first or second electrodes.
4. In an electrolytic storage device having first and second inert electrodes and a third electrode submerged in an electrolytic solution containing at least the salt of a metal and having the property that a certain theshold voltage must be exceeded between said electrodes before plating of the metal from the electrolytic solution onto the more negative electrode will occur, the combination comprising:
   writing means for applying a negative voltage to said second electrode with respect to said first electrode of a magnitude greater than said theshold voltage for causing plating of said metal out of said solution onto said negative electrode;
   reading means for applying a negative voltage to said first electrode with respect to said second electrode of a magnitude less than said threshold voltage for allowing current flow between said second electrode and said first electrode when said second electrode has metal plated on it;
   sensing means responsive to said current flow; and
   erasing means for applying a negative voltage to said third electrode with respect to said first and second electrodes of a magnitude less than said threshold voltage for removing metal plated on either said first or second electrodes.
5. A memory selection matrix comprising:
   a plurality of electrolytic storage elements, each of said elements having first and second inert electrodes submerged in an electrolytic solution containing at least the salt of a metal and having the property that a certain threshold voltage must be exceeded between said electrodes before plating of the metal from the electrolytic solution onto the more negative electrode will occur, said elements arranged in columns and rows;
   bit selection means connecting all of the second electrodes of said elements in each row in common;
   word selection means connecting all of the first electrodes of said elements in each column in common; and
   writing means for selectively energizing said bit selection means and said word selection means so that a voltage in excess of said threshold is impressed across electrodes of the storage elements at the intersection of said energized rows and said energized columns, thereby causing plating on the second electrodes of the storage elements;
   and reading means connecting all of the first electrodes of said elements in each column in common for applying a voltage less than threshold voltage to said first electrodes of said elements so that metal is caused to be plated onto said first electrodes of said elements only if said second electrodes of said elements have metal plated on them.
6. A memory selection matrix comprising:
   a plurality of electrolytic storage elements, each of said elements having first and second inert electrodes submerged in an electrolytic solution containing at least the salt of a metal and having the property that a certain threshold must be exceeded between said electrodes before plating of the metal from electrolytic solution onto the more negative electrode will occur, said elements arranged in columns and rows;
   bit selection means connecting all of said second electrodes in each row in common for applying a first voltage to all of said second electrodes in a row upon energization of said bit selection means;
   voltage selection means for selectively generating a second voltage output level, said second voltage being positive with respect to said first voltage, the difference between said first voltage and said second voltage being greater than said threshold voltage;
   word selection means connecting all of said first electrodes in each column in common for apply said voltage selection means output level to all of said second electrodes in a column upon energization of said word selection means;
   whereby writing occurs upon selection of said second voltage by said voltage selection means and energization of said word selection means for a particular column and energization of said bit selection means for a particular row thus plating on the second electrode of the storage element at the intersection of the energized row and column.
7. A memory selection matrix comprising:
   a plurality of electrolytic storage elements, each of said elements having first and second inert electrodes submerged in an electrolytic solution containing at least the salt of a metal and having the property that a certain threshold must be exceeded between said electrodes before plating of the metal from the electrolytic solution onto the more negative electrode will occur, said elements arranged in columns and rows;
   bit selection means connecting all of said second elec- trodes in each row in common for applying a first voltage to all of said second electrodes in a row upon energization of said bit selection means;

voltage selection means for selectively generating second and third voltage output levels, said second voltage being positive with respect to said first voltage, the difference between said first voltage and said second voltage being greater than said threshold voltage, said third voltage being negative with respect to said first voltage, the difference between said first voltage and said third voltage being less than said threshold voltage;

word selection means connecting all of said first electrodes in each column in common for applying said voltage selection means output levels to all of said first electrodes in a column upon energization of said word selection means;

sensing means responsive to current flow between said first and said second electrodes for indicating the presence or absence of said current flow;

whereby writing occurs upon selection of said second voltage by said voltage selection means and energization of said word selection means for a particular column and energization of said bit selection means for a particular row thus plating on the second electrode of the storage element at the intersection of the energized row and column, and reading occurs upon selection of said third voltage by said voltage selection means and energization of said word selection means for a particular column thus causing current flow between said first and said second electrodes of the storage element at the intersection of the energized row and column.

8. A memory selection matrix comprising:

a plurality of electrolytic storage elements, each of said elements having first and second inert electrodes and a third electrode submerged in an electrolytic solution containing at least the salt of a metal and having the property that a certain threshold must be exceeded between said electrodes before plating of the metal from electrolytic solution onto the more negative electrode will occur, said elements arranged in columns and rows;

bit selection means connecting all of said second electrodes in each row in common for applying a first voltage to all of said second electrodes in a row upon energization of said bit selection means;

voltage selection means for selectively generating second, third and fourth voltage output levels, said second voltage being positive with respect to said first voltage, the difference between said first voltage and said second voltage being greater than said threshold voltage, said third voltage being negative with respect to said first voltage, the difference between said first voltage and said third voltage being less than said threshold voltage, said fourth voltage being positive with respect to said first voltage, the difference between said first voltage and said fourth voltage being less than said threshold voltage;

word selection means connecting all of said first electrodes in each column in common for applying said voltage selection means output levels to all of said first electrodes in a column upon energization of said word selection means;

sensing means responsive to current flow between said first and said second electrodes for indicating the presence or absence of said current flow; and, erase selection means connecting all of said third electrodes in each column in common for applying a fifth voltage to all of said third electrodes in a column upon energization of said erase selection means, said fifth voltage being negative with respect to said first voltage;

whereby writing occurs upon selection of said second voltage by said voltage selection means and energization of said word selection means for a particular row thus plating on the second electrode of the storage element at the intersection of the energized row and column, and reading occurs upon selection of said third voltage by said voltage selection means and energization of said word selection means for a particular column thus causing current flow between said first and said second electrodes of the storage element at the intersection of the energized row and column, and resetting occurs upon selection of said fourth voltage by said voltage selection means and energization of said word selection means for a particular column and energization of said bit selection means for a particular row thus plating on the second electrode of the storage element at the intersection of the energized row and column, in proportion to the amount of plating pre-existent on said first electrode, and erasing occurs upon energization of said erase selection means for a particular column and energization of said bit selection means for a particular row thus plating on the third electrode of the storage element at the intersection of the energized row and column, in proportion to the amount of plating pre-existent on said first electrode.

9. In an electrolytic storage device having first and second inert electrodes submerged in an electrolytic solution containing at least the salt of a metal and having the property that a certain threshold voltage must be exceeded between said electrodes before plating of the metal from the electrolytic solution onto the more negative electrode will occur, the combination comprising:

a first voltage source for producing a voltage greater than said threshold voltage;

a second voltage source for producing a voltage less than said threshold voltage;

means for connecting said first voltage source to said first electrode so that a metal is caused to be plated out of said electrolytic solution onto said first electrode; and means for connecting said second voltage source to said second electrode so that metal is caused to be plated onto said second electrode only if said first electrode has metal plated on it.

References Cited in the file of this patent

UNITED STATES PATENTS

| | | |
|---|---|---|
| 2,791,473 | Mattox | May 7, 1957 |
| 3,017,612 | Singer | Jan. 16, 1962 |